(12) United States Patent
Arnold et al.

(10) Patent No.: US 6,437,081 B1
(45) Date of Patent: Aug. 20, 2002

(54) OXYALLYL PENDENT BENZAZOLE POLYMERIC MATERIALS

(75) Inventors: Fred E. Arnold; Thuy D. Dang, both of Centerville; Robert J. Spry, Tipp City; Max D. Alexander, Kettering, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/777,384

(22) Filed: Feb. 13, 2001

(51) Int. Cl.[7] .............................................. C08G 73/22

(52) U.S. Cl. .................. 528/183; 528/185; 528/193; 528/332; 528/422; 528/425; 525/434; 525/420

(58) Field of Search ................................ 528/183, 185, 528/193, 332, 422, 425; 525/434, 420

(56) References Cited

U.S. PATENT DOCUMENTS

| | | | | |
|---|---|---|---|---|
| 5,492,996 A | * | 2/1996 | Dang et al. ................. | 528/171 |
| 5,998,550 A | * | 12/1999 | Dang et al. ................. | 525/420 |
| 6,025,439 A | * | 2/2000 | Dang et al. ................. | 525/180 |
| 6,057,417 A | | 5/2000 | Arnold et al. | |

OTHER PUBLICATIONS

T.D. Dang, L.S. Hudson, W.A. Feld, F.E. Arnold, Synthesis and Characterization of Aromatic Benzooxazoles Containing Allylether Pendent Groups, Polymer Preprints, vol. 41, No. 1, Mar. 2000, Published Feb. 22, 2000, pp. 103–104.

* cited by examiner

*Primary Examiner*—Duc Truong
(74) *Attorney, Agent, or Firm*—Charles E. Bricker; Thomas L. Kundert

(57) ABSTRACT

Oxyallyl pendent polymer system having repeating units of the formulae

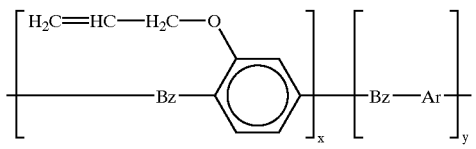

hereinafter referred to as structure A, wherein x has a value of about 0.1 to 1.0 and y has a value of 1.0-x, and

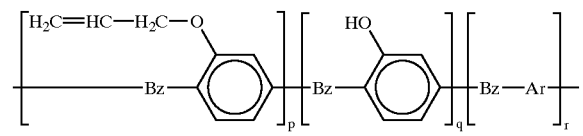

hereinafter referred to as structure B, wherein the sum of p+q has a value of about 0.1 to 1.0, r has a value of 1.0-(p+q) and the molar ratio of p:q is about 9:1 to 1:9, wherein Bz is a benzazole unit selected from the group consisting of

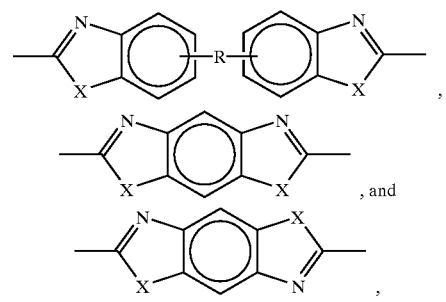

wherein X is —O—, —S— or —NH—, and R is selected from the group consisting of

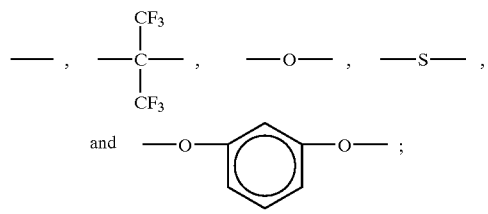

and wherein Ar is an aromatic group.

8 Claims, No Drawings

OXYALLYL PENDENT BENZAZOLE POLYMERIC MATERIALS

RIGHTS OF THE GOVERNMENT

The invention described herein may be manufactured and used by or for the Government of the United States for all governmental purposes without the payment of any royalty.

BACKGROUND OF THE INVENTION

The present invention relates to novel high performance polymer compositions that can be utilized for microelectronic packaging.

Fluorine-containing polymeric materials are used in a variety of space and aerospace applications. Although the costs of such materials are high, they have the desirable characteristic of lowering the dielectric constant of a polymeric system. Low dielectric properties of a material are of particular importance in the area of microelectronic packaging. Interconnect processing of functional devices on the silicon chip will soon require insulators with dielectric constants from 2.0–2.4. These materials must also exhibit $T_g$'s between 350–400° C., excellent thermo-oxidative stability, and low moisture uptake to be compatible with lead-bath processing.

In U.S. Pat. No. 6,057,417, issued May 2, 2000 to Fred E. Arnold, et al, there is disclosed a polymer system having repeating units of the formula:

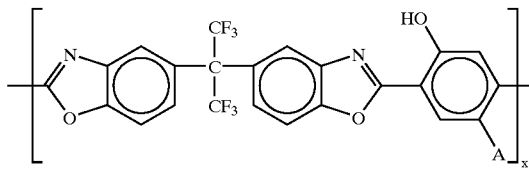

wherein A is —H or —OH, x has a value of 0.5 to 1.0 and y has a value of 1.0-x. These polymers meet the requirements set forth above.

We have now discovered that these and other benzazole polymers and copolymers containing the 2-hydroxy-p-phenylene moiety can be made crosslinkable.

Accordingly, it is an object of the present invention to provide crosslinkable benzazole polymers and copolymers.

Other objects, aspects and advantages of the present invention will be apparent to those skilled in the art from a reading of the following detailed disclosure of the invention.

SUMMARY OF THE INVENTION

In accordance with the invention there is provided an oxyallyl pendent polymer system having repeating units of the formulae

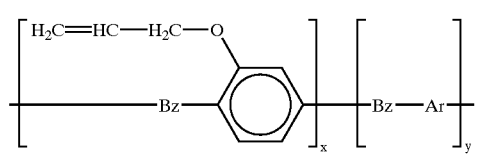

hereinafter referred to as structure A, wherein x has a value of about 0.1 to 1.0 and y has a value of 1.0-x, and

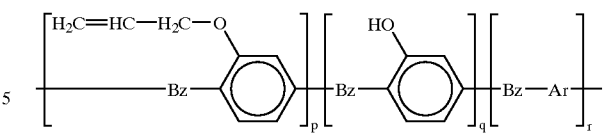

hereinafter referred to as structure B, wherein the sum of p+q has a value of about 0.1 to 1.0, r has a value of 1.0-(p+q) and the molar ratio of p:q is about 9:1 to 1:9, wherein Bz is a benzazole unit selected from the group consisting of

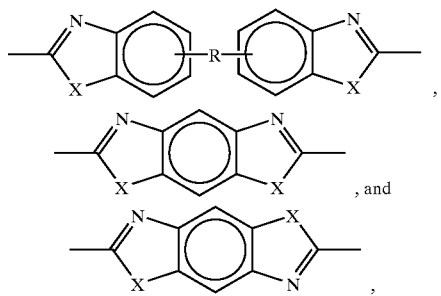

wherein X is —O, —S— or —NH—, and R is selected from the group consisting of

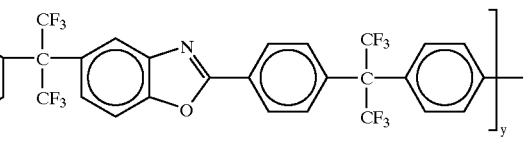

and wherein Ar is an aromatic group.

DETAILED DESCRIPTION OF THE INVENTION

The polymers and copolymers of this invention are derived from polymers and copolymers containing the 2-hydroxy-p-phenylene moiety. The incorporated 2-hydroxy-p-phenylene repeat unit allows for post-polymer reactions to provide oxyallyl pendent groups which can be used to cure or crosslink the polymer/copolymer units.

The derivitizable polymers and copolymers are prepared by the condensation of 2-hydroxyterephthalic acid, a benzazole precursor such as

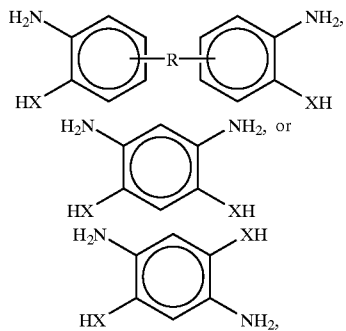

wherein R and X are as defined previously, and, optionally, an aromatic dicarboxylic acid (HOOC—Ar—COOH), in polyphosphoric acid (PPA) at about 180° C., following procedures well known in the art, then recovered, also using procedures well known in the art.

The 2-hydroxy-p-phenylene-containing homo- and copolymer compositions are then derivatized utilizing the hydroxy proton. Derivatization of these compositions is carried out by treatment with excess potassium carbonate in dimethylformamide (DMF) to form the hydroxy potassium salt. The polymeric salt is then reacted with allylbromide to form the new oxyallyl composition. Structure A, above, results when excess allylbromide is used; structure B results when the quantity of allylbromide is limited to less than a stoichiometric amount, thereby limiting the degree of crosslinking in the later cured polymer. The resulting derivatized polymer/copolymer is recovered by precipitation into water, followed by soxhlet extraction with heptane to remove unreacted allylbromide. Alternatively, derivitization can be carried out with sodium hydride in dimethylsulfoxide (DMSO).

The pendent allyl polymer/copolymer can be crosslinked by heating or by using the appropriate free radical-initiating reagents. As shown in the Examples which follow, the polymer/copolymer exhibits two exotherms, the first about 220° to 250° C., and the second about 385° to 400° C. Accordingly, the polymer/copolymer can be crosslinked by heating to a temperature in the range of the first exotherm for a relatively short time, about 30 sec to 5 minutes, followed thereafter by heating to a temperature in the range of the second exotherm, again for a relatively short time. Alternatively, the polymer/copolymer can be crosslinked by heating to a temperature of about 260° C. in an inert atmosphere for about 30–120 minutes.

The following examples illustrate the invention. The polymer/copolymers used in these examples were synthesized from 2-hydroxyterephthalic acid, 2,2-bis(3-amino-4-hydroxyphenyl)hexafluoropropane and, where applicable, 2,2-bis(4-carboxyphenyl) hexafluoropropane, following the procedure given in the aforesaid U.S. Pat. No. 6,057,417, which is incorporated herein by reference.

EXAMPLE I

Derivatization of Aromatic Benzoxazole Polymer Containing 100 Percent Hydroxyl Pendent (Polymer I)

Into the bottom of a 250 ml, three neck, round bottom flask equipped with a mechanical stirrer, thermometer, and a nitrogen inlet/outlet, was charged 0.40 g (2.9 mmole) of potassium carbonate and 50 g of anhydrous dimethylformamide. The mixture was stirred under nitrogen for 30 minutes, after which time 1.30 g (2.73 mmole) of aromatic benzoxazole containing 100 percent hydroxyl pendent (intrinsic viscosity 1.1 dl/g, methanesulfonic acid, 30° C., 0.25 g/dl) was added. The suspension was stirred for 16 hours at 60° C., during which time the polymer -completely dissolved and a red, homogeneous solution resulted. The solution was cooled to room temperature, and 0.35 g (2.9 mmole) of allylbromide was added. The mixture was stirred under slightly positive nitrogen at 40° C. for 16 hours during which time, the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 1.36 g. An intrinsic viscosity of 1.20 dl/g (methanesulfonic acid, 30° C., 0.25 g/dl) was recorded for the polymer.

Into a 50 ml Erlenmeyer flask equipped with a stirring bar, were placed 0.1 g of polymer I and 10 ml of anhydrous chloroform. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer.

EXAMPLE II

Derivatization of Aromatic Benzoxazole Copolymer Containing 90 Percent Hydroxyl Pendent (Polymer II)

Into the bottom of a 250 ml, three neck, round bottom flask equipped with a mechanical stirrer, thermometer, and a nitrogen inlet/outlet, was charged 0.3 g (2.2 mmole) of potassium carbonate and 50 g of anhydrous dimethylformamide. The mixture was stirred under nitrogen for 30 minutes, after which time 1.0 g (2.0 mmole) of aromatic benzoxazole copolymer containing 90 percent hydroxyl pendent (intrinsic viscosity 1.2 dl/g, methanesulfonic acid, 30° C., 0.25 g/dl) was added. The suspension was stirred for 16 hours at 60° C., during which time the polymer completely dissolved and a red, homogeneous solution resulted. The solution was cooled to room temperature, and 0.26 g (2.2 mmole) of allylbromide was added. The mixture was stirred under slightly positive nitrogen at 40° C. for 16 hours during which time, the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 1.0 g. An intrinsic viscosity of 1.41 dl/g (methanesulfonic acid, 30° C., 0.25 g/dl) was recorded for the polymer.

Into a 50 ml Erlenmeyer flask equipped with a stir bar, were placed 0.1 g of polymer II and 10 ml of anhydrous chloroform. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer

EXAMPLE III

Derivatization of Aromatic Benzoxazole Copolymer Containing 70 Percent Hydroxyl Pendent (Polymer III)

Into the bottom of a 250 ml, three neck, round bottom flask equipped with a mechanical stirrer, thermometer, and a nitrogen inlet/outlet, was charged 0.28 g (2.04 mmole) of potassium carbonate and 50 g of anhydrous dimethylformamide. The mixture was stirred under nitrogen for 30 minutes, after which time 1.0 g (1.85 mmole) of aromatic benzoxazole copolymer containing 70 percent hydroxyl pendent (intrinsic viscosity 1.25 dl/g, methanesulfonic acid, 30° C., 0.25 g/dl) was added. The suspension was stirred for 16 hours at 60° C., during which time the polymer completely dissolved and a red, homogeneous solution resulted. The solution was cooled to room temperature, and 0.25 g (2.04 mmole) of allylbromide was added. The mixture was stirred under slightly positive nitrogen at 40° C. for 16 hours during which time, the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 0.98 g. An intrinsic viscosity of 1.38 dl/g (methanesulfonic acid, 30° C., 0.25 g/dl) was recorded for the polymer.

Into a 50 ml Erlenmeyer flask equipped with a stir bar, were placed 0.1 g of polymer III and 10 ml of anhydrous chloroform. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer

EXAMPLE IV

Derivatization of Aromatic Benzoxazole Copolymer Containing 50 Percent Hydroxyl Pendent (Polymer IV)

Into the bottom of a 250 ml, three neck, round bottom flask equipped with a mechanical stirrer, thermometer, and a nitrogen inlet/outlet, was charged 0.26 g (1.88 mmole) of potassium carbonate and 50 g of anhydrous dimethylformamide. The mixture was stirred under nitrogen for 30 minutes, after which time 1.0 g (1.72 mmole) of aromatic benzoxazole copolymer containing 50 percent hydroxyl pendent (intrinsic viscosity 1.30 dl/g, methanesulfonic acid, 30° C., 0.25 g/dl) was added. The suspension was stirred for 16 hours at 60° C., during which time the polymer completely dissolved and a red, homogeneous solution resulted. The solution was cooled to room temperature, and 0.25 g (2.04 mmole) of allylbromide was added. The mixture was stirred under slightly positive nitrogen at 40° C. for 16 hours during which time, the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 0.98 g. An intrinsic viscosity of 1.42 dl/g (methanesulfonic acid, 30° C., 0.25 g/dl) was recorded for the polymer.

Into a 50 ml Erlenmeyer flask equipped with a stir bar, were placed 0.1 g of polymer IV and 10 ml of anhydrous chloroform. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer

EXAMPLE V

Derivatization of Aromatic Benzoxazole Copolymer Containing 50 Percent Hydroxyl Pendent (Polymer V)

Into the bottom of a 250 ml, three neck, round bottom flask equipped with a mechanical stirrer, thermometer, and a nitrogen inlet/outlet, was charged 0.026 g (0.19 mmole) of potassium carbonate and 50 g of anhydrous dimethylformamide. The mixture was stirred under nitrogen for 30 minutes, after which time 1.0 g (1.72 mmole) of aromatic benzoxazole copolymer containing 50 percent hydroxyl pendent (intrinsic viscosity 1.30 dl/g, methanesulfonic acid, 30° C., 0.25 g/dl) was added. The suspension was stirred for 16 hours at 60° C., during which time the polymer completely dissolved and a red, homogeneous solution resulted. The solution was cooled to room temperature, and 0.023 g (0.19 mmole) of allylbromide was added. The mixture was stirred under slightly positive nitrogen at 40° C. for 16 hours, during which time the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 0.95 g. An intrinsic viscosity of 1.40 dl/g (methanesulfonic acid, 30° C., 0.25 g/dl) was recorded for the polymer.

Into a 50 ml Erlenmeyer flask equipped with a stir bar, were placed 0.1 g of polymer V and 10 ml of anhydrous tetrahydrofuran. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer

EXAMPLE VI

Derivatization of Aromatic Benzoxazole Copolymer Containing 50 Percent Hydroxyl Pendent (Polymer VI)

Into the bottom of a 250 ml, three neck, round bottom flask equipped with a mechanical stirrer, thermometer, and a nitrogen inlet/outlet, was charged 0.013 g (0.095 mmole) of potassium carbonate and 50 g of anhydrous dimethylformamide. The mixture was stirred under nitrogen for 30 minutes, after which time 1.0 g (1.72 mmole) of aromatic benzoxazole copolymer containing 50 percent hydroxyl pendent (intrinsic viscosity 1.30 dl/g methanesulfonic acid, 30° C., 0.25 g/dl) was added. The suspension was stirred for 16 hours at 60° C., during which time the polymer completely dissolved and a red, homogeneous solution resulted. The solution was cooled to room temperature, and 0.011 g (0.095 mmole) of allylbromide was added. The mixture was stirred under slightly positive nitrogen at 40° C. for 16 hours during which time, the polymer solution became yellow and finally precipitated out the polymer. The mixture was poured into 500 ml of water and allowed to stir until the polymer was broken into fine suspension, the polymer was collected by suction filtration, acidified with 10% aqueous hydrochloric acid, and extracted in a soxhlet extraction apparatus with hexane for 24 hours. The polymer was dried under vacuum (0.002 torr) at 100° C. for 24 hours. The polymer yield was 0.92 g. An intrinsic viscosity of 1.43 dl/g (methanesulfonic acid, 30° C., 0.25 g/dl) was recorded for the polymer.

Into a 50 ml Erlenmeyer flask equipped with a stir bar, were placed 0.1 g of polymer VI and 10 ml of anhydrous tetrahydrofuran. The mixture was stirred until the polymer completely dissolved. The solution was filtered using a medium fritted funnel, poured into a casting dish and evaporated under nitrogen atmosphere for 24 hours. The resulting film was dried and heated at 260° C. under positive nitrogen atmosphere for one hour. The cured film was found completely insoluble in anhydrous chloroform at reflux temperature for 16 hours, indicating extensive crosslinking in the cured polymer

EXAMPLE VII

Derivatized Polymer Properties

Heating the fabricated films between 200° and 250° C. initiates a Clasien rearrangement providing the initial hydroxy groups for intramolecular hydrogen bonding and an ortho allyl pendent group. The resulting allyl group, on further heating (320–360° C.) crosslinks the polymer by a thermal induced free radical mechanism. Differential Scanning Calorimetry of the polymers shows two exotherms corresponding to thermal rearrangement (Exotherm 1) and thermal crosslinking (Exotherm 2). Polymer properties including intrinsic viscosity, thermal data and the onset of thermal degradation are shown in Tables Ia and Ib, below. For convenience, the polymer repeat structures are shown. In both structures, the Bz moiety is

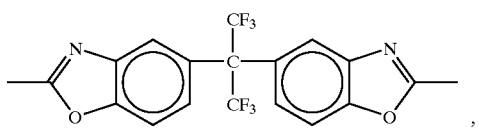

and the Ar moiety is

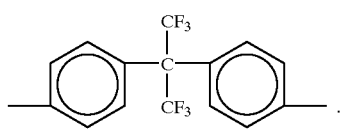

TABLE Ia

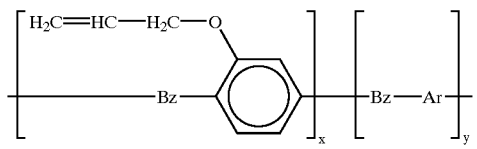

| Polymer of Example No. | x | y | [η] | Exotherm 1 (Max, ° C.) | Exotherm 2 (Max, ° C.) | Td (On-set, ° C.) |
|---|---|---|---|---|---|---|
| I | 100 | 0 | 1.20 | 220 | 395 | 527 |
| II | 90 | 10 | 1.41 | 240 | 386 | 514 |
| III | 70 | 30 | 1.38 | 228 | 398 | 516 |
| IV | 50 | 50 | 1.42 | 238 | 393 | 517 |

TABLE Ib

| Polymer of Example No. | p | q | r | [η] | Exotherm 1 (Max, ° C.) | Exotherm 2 (Max, ° C.) | Td (On-set, ° C.) |
|---|---|---|---|---|---|---|---|
| V | 10 | 40 | 50 | 1.40 | 244 | 385 | 514 |
| VI | 5 | 45 | 50 | 1.43 | 248 | 390 | 519 |

The dielectric properties of the polymers, before and after thermally induced crosslinking, are shown in Table II, below. Dielectric constants were measured at 100 10 Hz, 10 Hz and 1 MHz. The low dielectric constants, high Tg, excellent thermooxidative stability and imperviousness to solvent stripping agents make these polymers very attractive materials for microelectronic packaging in a lead bath processing environment.

TABLE II

| Polymer of Example No. | 100 Hz | 10 Hz | 1 MHz | Crosslinked 100 Hz | Crosslinked 10 Hz | Crosslinked 1 MHz |
|---|---|---|---|---|---|---|
| I | 2.36 | 2.33 | 2.32 | 2.20 | 2.18 | 2.18 |
| II | 2.88 | 2.83 | 2.82 | 3.12 | 3.12 | 3.09 |
| III | 2.73 | 2.70 | 2.66 | 2.52 | 2.48 | 2.47 |
| IV | 2.67 | 2.63 | 2.62 | 2.51 | 2.48 | 2.47 |
| V | 3.38 | 3.31 | 3.25 | 2.83 | 2.81 | 2.80 |

Having thus described exemplary embodiments of the present invention, it should be noted by those skilled in the art that the disclosures herein are exemplary only and that alternatives, adaptations and modifications may be made within the scope of the present invention.

We claim:

1. A polymer system having repeating units of the formulae wherein x has a value of about 0.1 to 1.0 and y has a value of 1.0-x, wherein Bz is a benzazole unit selected from the group consisting of

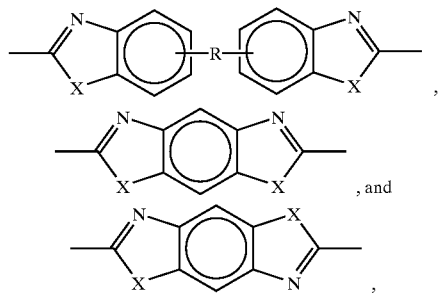

wherein X is —O—, —S— or —NH—, and R is selected from the group consisting of

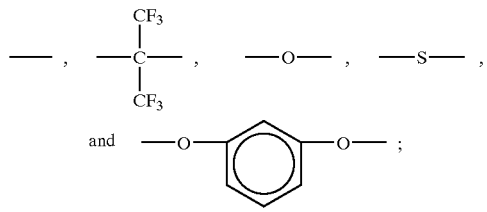

and wherein Ar is an aromatic group.

2. The polymer system of claim 1 wherein x has a value of 1.0, Bz is

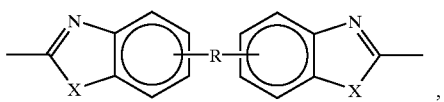

R is —C(CF$_3$)$_2$—, and X is —O—.

3. The polymer system of claim 1 wherein x has a value of 0.9, Bz is

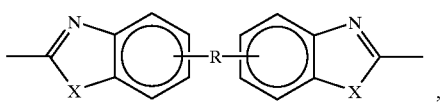

R is —C(CF$_3$)$_2$—, X is —O—, and Ar is 2,2-bis(4-phenylene) hexafluoropropane.

4. The polymer system of claim 1 wherein x has a value of 0.7, Bz is

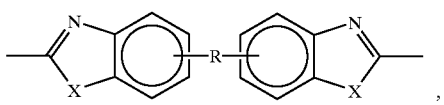

R is —C(CF$_3$)$_2$—, X is —O—, and Ar is 2,2-bis(4-phenylene) hexafluoropropane.

5. The polymer system of claim 1 wherein x has a value of 0.5, Bz is

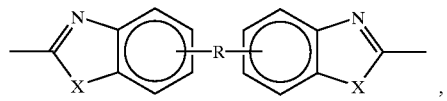

R is —C(CF$_3$)$_2$—, X is —O—, and Ar is 2,2-bis(4-phenylene) hexafluoropropane.

6. A polymer system having repeating units of the formulae

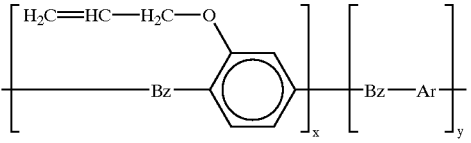

wherein the sum of p+q has a value of about 0.1 to 1.0, r has a value of 1.0-(p+q) and the molar ratio of p:q is about 9:1 to 1:9, wherein Bz is a benzazole unit selected from the group consisting of

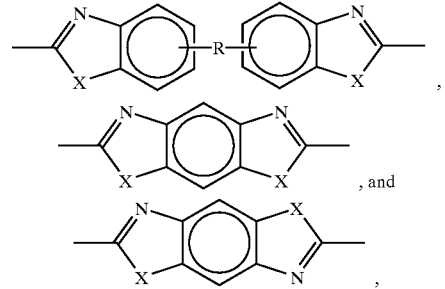

wherein X is —O—, —S— or —NH—, and R is selected from the group consisting of

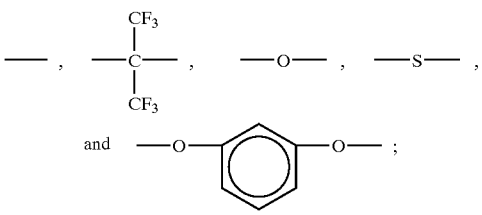

and wherein Ar is an aromatic group.

7. The polymer system of claim 6 wherein p has a value of 0.1, q has a value of 0.4, Bz is

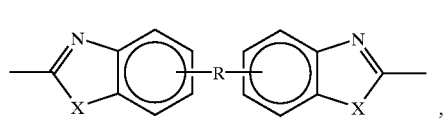

R is —C(CF$_3$)$_2$—, X is —O—, and Ar is 2,2-bis(4-phenylene) hexafluoropropane.

8. The polymer system of claim 6 wherein p has a value of 0.05, q has a value of 0.45, Bz is

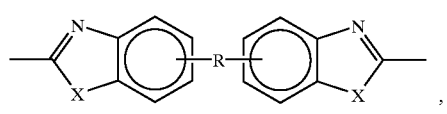

R is —C(CF$_3$)$_2$—, X is —O—, and Ar is 2,2-bis(4-phenylene) hexafluoropropane.

* * * * *